Jan. 9, 1962 W. R. JOHNSON 3,016,415

COLOR STABILIZING VIDEO TAPE REPRODUCING SYSTEM

Filed Jan. 19, 1959 3 Sheets-Sheet 1

INVENTOR:
Wayne R. Johnson
By Smyth & Roston
Attorneys

INVENTOR:
Wayne R. Johnson
By Smyth & Roston
Attorneys

COLOR STABILIZING VIDEO TAPE REPRODUCING SYSTEM

Filed Jan. 19, 1959 3 Sheets-Sheet 3

INVENTOR:
Wayne R. Johnson
By Smyth & Roston
Attorneys

United States Patent Office 3,016,415

Patented Jan. 9, 1962

3,016,415

COLOR STABILIZING VIDEO TAPE REPRODUCING SYSTEM

Wayne R. Johnson, Los Angeles, Calif., assignor to Minnesota Mining & Manufacturing Company, St. Paul, Minn., a corporation of Delaware Filed Jan. 19, 1959, Ser. No. 787,459
20 Claims. (Cl. 178—6.6)

This invention relates to apparatus for recording and reproducing color television signals and, more particularly, to apparatus for stabilizing the color information of directly recorded and reproduced chrominance signals.

In the "NTSC" color television system which is standard in the United States, the chrominance signals contain information relating to the hues and saturation of the colors but not to their brightness. The NTSC color television signal includes a signal representative of the luminance and brightness of the successive picture points regardless of their color and also includes side bands resulting from the modulation of two chrominance signals on two sub-carriers. The modulated sub-carriers which are of the same nominal frequency but in quadrature are combined to produce a single train of color signals modulated in both phase and amplitude.

At the beginning of each of the horizontal scanning lines which trace the color television picture, a color synchronizing signal is supplied which includes a burst of the color sub-carrier frequency. The burst of color sub-carrier frequency is utilized as a reference signal to establish the phase of an oscillator in the television receiver. The signal from the oscillator in the receiver is resolved into orthogonal components which are employed in separate demodulators to recover the two chrominance signals. The hues reproduced at the receiver are dependent upon the phase of the side band frequencies as compared with the phase of the periodic bursts of the reference frequency and the intensity of the hues is dependent upon the amplitude of the side band frequencies.

An error in relative phase between the reference signals and the phase of the following chrominance signals of even 5 degrees causes a perceptible difference in the hues of the reproduced colors. This phase difference corresponds to a time difference of only approximately 0.004 microsecond.

In my co-pending patent application Serial No. 733,165, filed on May 5, 1958, there is disclosed and claimed a traveling wave transducer head for transversely recording wide band signals on successive transverse tracks of a longitudinally moving magnetic tape. By transversely recording information on the magnetic tape, the longitudinal movement of the tape may be materially reduced without reducing the reproducible band width or attenuating the higher frequencies of the wide band signals.

The transducer head disclosed and claimed in co-pending application Serial No. 733,165 is stationary and is provided with a tubular shape and is disposed in a transverse direction across the tape. Transverse recording or reproducing is achieved even though the transducer head is stationary by exciting longitudinal or transverse elastic waves in the head which move transversely with respect to the longitudinal direction of movement of the magnetic tape. The transducer head includes a tube which is magnetostrictive and the elastic waves momentarily relieve stresses normally in the tube so that, in effect, the elastic waves function as enabling waves by locally changing the permeability of the tube. A signal coil is coupled to the tube for introducing frequency modulated signals to be recorded and for reproducing frequency modulated signals from the magnetic tape.

In order to accurately reproduce recorded signals, it is necessary that the tape speed and position be accurately coordinated with the repetition rate of the excited elastic waves in the head. Even though the tape is being advanced at the proper speed, an uncoordinated elastic wave may travel down the transducer head tube at a point between two transverse tracks. Moreover, even though the tape is being advanced with the proper speed, any transverse movement of the tape with respect to the head will phase modulate the signals being recorded or reproduced. The signals are phase modulated because the relative movement between the elastic waves in the transducer head and the tape varies with variations in the transverse movement of the tape. If the tape moves in a transverse direction opposite to the direction of the elastic wave in the transducer head, the phase of the recorded or reproduced signals is advanced because each wave more rapidly traverses the transverse track on the tape. Conversely, if the tape moves in the same transverse direction as the direction of the elastic waves, the phase of the recorded or reproduced signals is delayed because each wave more slowly traverses the transverse tracks.

When the information to be recorded or reproduced is in the form of color television chrominance signals or the like wherein the relative phase between information signals and reference signals is indicative of the information, the phase modulation resulting from variations in tape speed and from transverse movement of the magnetic tape adjacent the transducer head changes the information. As indicated above, even a 5 degree error in phase of the chrominance signals causes a perceptible difference in the hues of the reproduced colors. In equipment being utilized for progressing the magnetic tape adjacent the transducer head, minute variations in tape speed and transverse movements of the tape providing for such errors are often unavoidable. These errors, moreover, are cumulative with a phase modulation error being introduced in recording the signals and an additional error being introduced in reproducing the signals.

In one specific embodiment of this invention, the color hues indicated by the phase displacement of the chrominance information signals from the bursts of reference frequency are stabilized by adjusting the repetition rate of the elastic waves in the traveling wave transducer head. The waves in the transducer head are generated by a piezoelectric crystal which is periodically excited by pulses supplied from a constant frequency pulse source to the crystal through a variable delay circuit. The delay provided by the variable delay circuit for the pulses is dependent upon the characteristics of an error signal which is developed from the reproduced reference bursts of the chrominance signals.

The reproduced chrominance signals from the traveling wave transducer head are supplied to delay means having a delay period equal to the transit time for reproducing one transverse track on the magnetic tape. The reference bursts of the delayed chrominance signals are separated from the chrominance information signals of the delayed signals by gating means. The operation of such gating means is controlled by the constant frequency pulse source which also excites the piezoelectric crystal in the transducer head. The pulses from the pulse source to the gating means are also delayed by an interval equal to the transit for reproducing one transverse track to be in step with the delayed bursts of reference frequency.

The phase of the separated bursts of reference frequency from the gating means is compared with the phase of a signal from a reference source of frequency in a phase detector or comparator. The signal from the reference source has the same nominal frequency as the sub-carrier frequency which is utilized for the bursts of reference frequency in the chrominance signal. The phase comparator generates an error signal having a magnitude and polarity related to the magnitude and direction of the phase deviation of the bursts of reference frequency with respect to the phase of the signal from the reference source. The error signal from the comparator is supplied to the variable delay circuit to adjust the delay provided by the variable delay circuit for the pulses from the pulse source to the crystal in the transducer head.

The longitudinal variations of tape speed and the transverse movement of the tape are generally relatively slow cyclical variations and movements compared to the repetition rate of the transverse waves in the head. Six transverse tracks may be utilized for recording one horizontal scanning line of the traced television picture so that the repetition rate, therefore, for recording or reproducing the transverse tracks may be six times the horizontal line frequency of 15,750 cycles per second, or 94,500 cycles per second, whereas the frequency of the transverse cyclical movement of the tape may be only 20 or 40 cycles per second. Due to the relatively slow longitudinal and transverse oscillation of the tape, any six transverse tracks including one set of the reference and information frequencies corresponding to one horizontal scanning line may be considered to be moving in the same direction and at the same speed from the standpoint of the deviations being produced at any instant.

By delaying the burst of reference frequency for an interval equal to the transit time of a transverse track, the phase of the information signals relative to the preceding burst of reference signals is adjusted. If the phase deviation due to the movement of the tape is a leading deviation, the delay for exciting a transverse wave in the transducer head is increased to delay reproducing the information signals. The burst of reference frequency, which occupies only one transverse track, is completely reproduced due to the delay so that it is not affected by the error signal derived due to its phase deviation. In this manner, by adjusting the phase deviation between the following information signals and the bursts of reference frequency, information, relating to the color hues of the color television picture is stabilized.

Further features and advantages of this invention will become apparent upon consideration of the following description taken in conjunction with the drawing wherein.

Figures 5, 6:
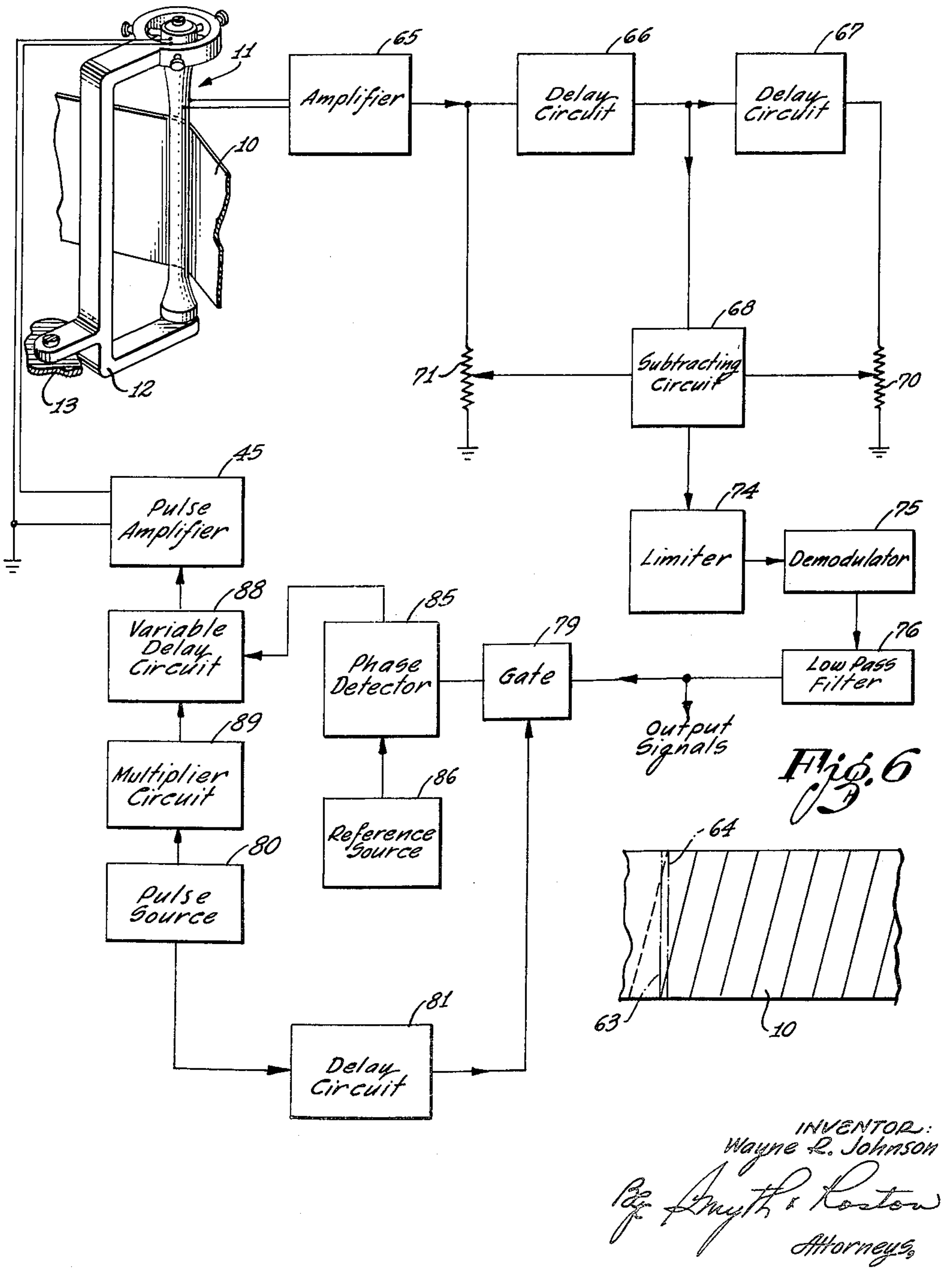

FIGURE 5 is a circuit representation of the color stabilization system of this invention including a perspective view of the transducer head and magnetic tape; and FIGURE 6 is a diagrammatic representation of a section of the magnetic tape illustrating on an exaggerated scale the relative positions of successive transverse tracks with respect to the instantaneous position of the recording gap formed therealong by successive elastic waves.

The stabilization system of this invention, which is shown in FIGURE 5 is utilized to compensate for phase modulation introduced by recording and reproducing color television chrominance or other like signals. The phase modulation may be due to variations in the longitudinal movement or due to a transverse movement of a magnetic tape 10 adjacent a traveling wave transducer head 11 which is briefly hereafter described herein in reference to FIGURES 2, 3 and 4 and which is described in detail in my co-pending application Serial No. 733,165 filed on May 5, 1958.

Figure 1:
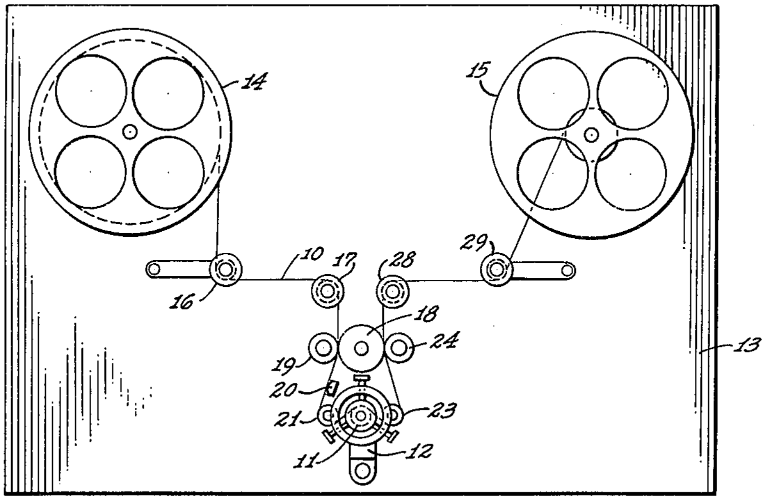
FIGURE 1 is a schematic diagram of equipment for moving magnetic tape, especially at positions adjacent the traveling wave transducer head.

The tubular shaped transducer head 11 is supported by an adjustable bracket 12 which is rigidly secured to a panel 13 on which tape transport equipment shown in FIGURE 1 is mounted. Referring to FIGURE 1, the tape transport equipment for progressing the magnetic tape 10 adjacent to the transducer head 11 is shown in highly diagrammatic form. The transducer head 11 records and reproduces information on succesive transverse tracks across the magnetic tape 10. The magnetic tape 10 is driven from a pay-out reel 14 adjacent the transducer head 11 and rewound on a take-up reel 15. The magnetic tape 10 may be tensioned by individual motors, not shown, which drive the pay-out reel 14 and the take-up reel 15.

From the pay-out reel 14, the magnetic tape 10 passes over a spring-actuated tensioning arm 16 about which it turns at substantially a right angle to pass over a guide post or roller 17. At the roller 17, the magnetic tape 10 again makes a right angle turn to pass between a drive capstan 18 and a rubber nip-roller 19 and then against a cleaning device 20 to another guide post or the roller 21. The roller 21 directs the magnetic tape 10 over the transducer head 11 at a particular angle relative to the transducer head 11. The magnetic tape 10 passes from the head 11 to the reel 15 along a path which is substantially the image of the path from the reel 14 to the head 11. The path from the transducer head 11 is over a roller 23, between a nip-roller 24 and the drive capstan 18, roller 28 and spring actuated tension arm 29 to the take-up reel 15. The drive, therefore, for the magnetic tape 10 is a tight loop drive wherein the speed of the magnetic tape 10 is dependent primarily upon the peripheral speed of the drive capstan 18. Transverse movement of the tape 10 relative to the panel 13, which may occur at any point from the reel 14 to the reel 15, is usually due to slightly misaligned tape on the reel 14.

Figures 2, 3:
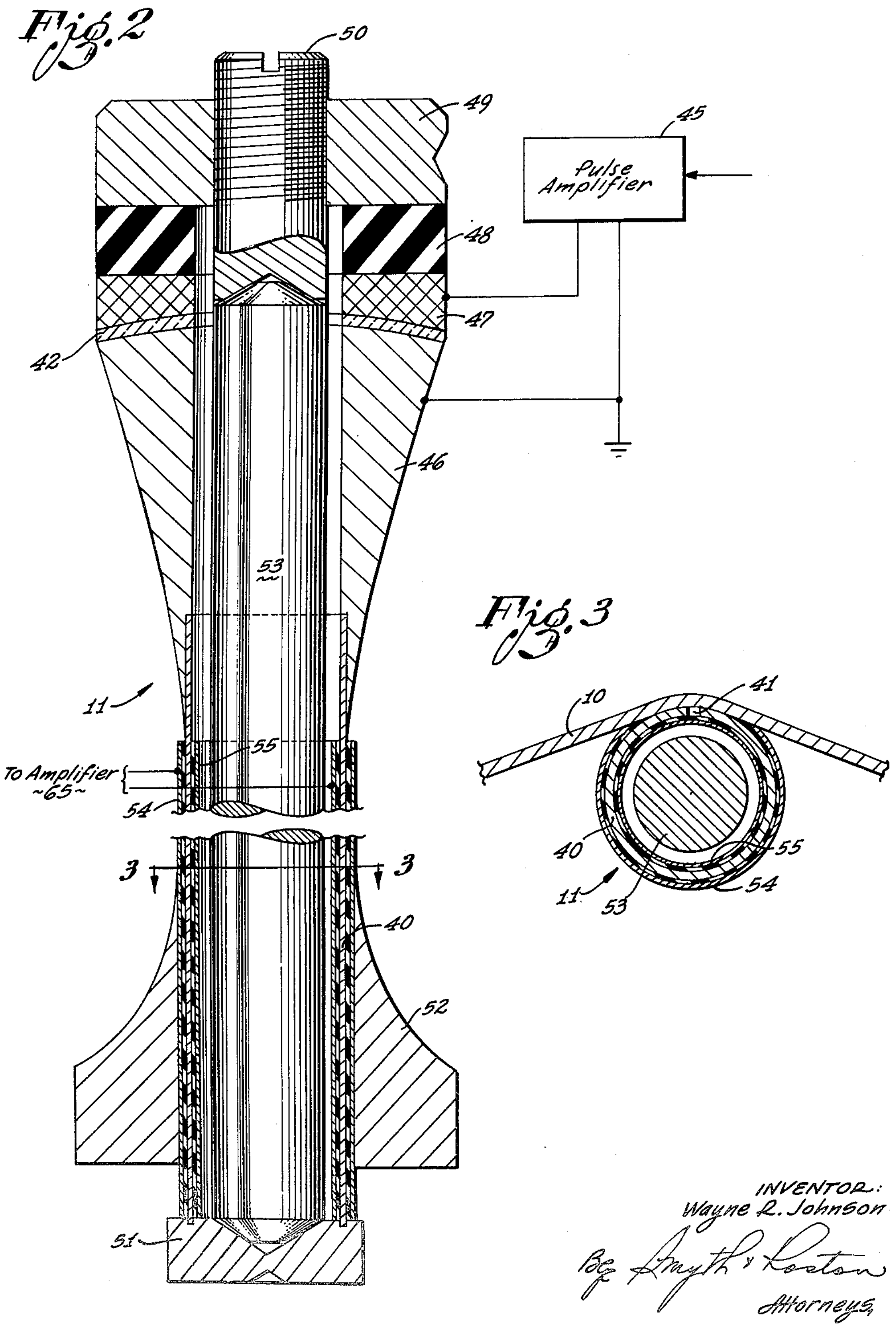
FIGURE 2 is a longitudinal sectional view of the transducer head utilized in the color stabilization station of this invention.
FIGURE 3 is a sectional view of the transducer head taken through line 3—3 of FIGURE 2.

As shown particularly in FIGURES 2 and 3, the transducer head 11 includes a tube 40 of magnetostrictive material which changes its magnetic properties with stress. The magnetostrictive tube 40, which may be made of "Permalloy" tape has a non-magnetic gap 41 extending longitudinally along the tube 40. Elastic waves are transmitted longitudinally through the magnetostrictive tube 40 by a piezoelectric crystal 42 responsive to voltage pulses developed by a pulse amplifier 45. The pulses developed by the amplifier 45 are 0.1 microsecond in duration and have an adjustable repetition period which is slightly less than that required to transmit an elastic wave or acoustic pulse through the magnetostrictive tube 40.

At one end of the magnetostrictive tube 40, an accoustic transformer section 46 is mounted to couple acoustic waves generated by the piezoelectric crystal 42 to the magnetostrictive tube 40. The other side of the crystal 42 is attached to an annulus 47 which functions as a buttress against which the crystal 42 acts to deliver pulsed energy developed thereby to the acoustic transformer section 46. The annulus 47 is in turn backed by an annulus 48 of insulating material which is a good absorber of sound. The absorbent annulus 48 is in turn secured to a metal cap or nut 49 which is internally threaded to receive an adjusting screw 50.

At the opposite end of the magnetostrictive tube 40, a cap 51 and an acoustic absorbent section 52 is mounted. The waves generated from the crystal 42 are transmitted or propagated through the acoustic transformer section 46 and the magnetostrictive tube 40 to the absorbing section 52. The structure including the magnetostrictive tube 40 is placed in tension by means of a strut 53 extending longitudinally through the tube 40 and bearing at one end in a depression formed in the inner end of the adjusting screw 50 and at the other end in a similar depression in the cap 51.

Figure 4:
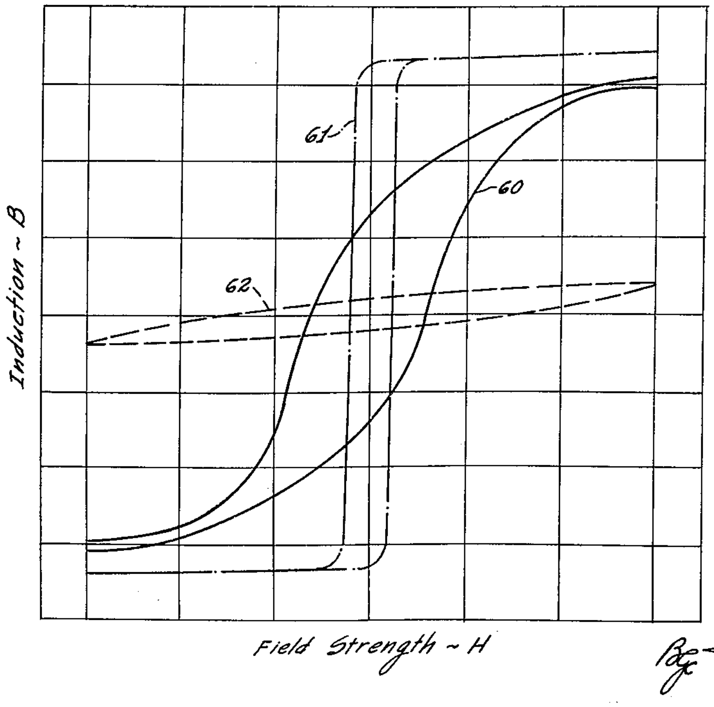
FIGURE 4 is a series of curves illustrating the magnetic properties of the magnetostrictive tube material under tension and as affected by an elastic wave.

The effect of the stresses applied to the magnetostrictive tube 41 due to the acoustic waves from the piezoelectric crystal 42 are illustrated in FIGURE 4. In FIGURE 4 the hysteresis loop 60 is that of the unstressed tube 40 and the slope of the loop represents its permeability. When the tube 40 is stressed longitudinally due to the effect of the nut 49 on the adjusting screw 50 the shape of the hysteresis loop is changed materially to that of the hysteresis loop 61. The hysteresis loop 61 is nearly rectangular in form having a very steep slope almost to the point of saturation. Circumferentially, however, the effect of the tension causes the slope of the hysteresis loop or the permeability groove to approach zero as indicated by the loop 62. In other words, the magnetostrictive tube 40 acts as though it were non-magnetic to circumferential fields. Circumferential fields are induced by a signal winding including the plated sections 54 and 55 which are plated on the exterior and interior respectively of the magnetostrictive tube 40.

A relaxation of the stress in the tube 40 causes the permeability to change back towards its normal condition as indicated by the curve 60. The acoustic waves or elastic pulses which are generated by the piezoelectric crystal change the permeability of positions of the tube 40 along the wave due to the momentary relaxation of the stress. In this manner, the acoustic wave changes the condition of successive positions along the tube 40 from being effectively non-magnetic to being effectively magnetic. When the wave passes, the portions return to their normal effectively non-magnetic condition determined by the applied stresses.

During the time that an acoustic wave is transmitted longitudinally through the magnetostrictive tube 40, a signal current applied to the plated windings 55 and 54 is effectively recorded on the magnetic tape 10 which is positioned against the gap 41 in the tube 40. As the tape 10 is progressed along its longitudinal axis adjacent the magnetostrictive tube 40 of the transducing head 11, the successive acoustic waves through the tube 40 cause the signals introduced to the windings 54 and 55 to be recorded as successive transverse tracks on the magnetic tape 10 which are illustrated in FIGURE 6.

In FIGURE 6, the virtual recording gap of the head 11 towards the termination of one transverse track is indicated at 63 and at the beginning of the next transverse track at 64. The spacing of the two gaps 63 and 64 indicates that some of the information at the end of one track is also recorded at the beginning of the next track as one acoustic wave is initiated before its preceding wave has completely traversed the magnetostrictive tube 40.

When the magnetic tape 10 is moved adjacent to the head 11 in the manner described above and illustrated in FIGURES 1 and 5, any variation of the longitudinal speed of the tape 10 and any transverse movement of the tape 10 relative to the head 11 phase modulates the signals being recorded or reproduced. The signals recorded on the tape may be color television chrominance signals frequency modulated on a carrier which may, for example, be a 10 megacycle signal. FIGURE 5 illustrates a reproducing system for stabilizing the reproduced color television chrominance signals, by compensating for the phase modulation due to longitudinal speed variation and due to transverse tape movements during both recording and reproducing sequences.

As shown in FIGURE 5, the reproduced chrominance signals from the transducer head 11 are coupled through a wide band amplifier 65 to a delay circuit or line 66. The delay circuit 66 provides for a delay of 10.55 microseconds which corresponds to the transit time for reproducing the information in one transverse track on the magnetic tape 10. The delay provided by the circuit 66, therefore, is equal to the time for an acoustic wave to pass through the magnetostrictive tube 40 from one edge of the tape 10 to the other. The acoustic waves traverse the magnetostrictive tube 40 at a relatively high speed of approximately 15,750 feet per second which, in terms of the line frequency utilized in television transmission is about 1 foot per picture line or 6 transverse tracks across the magnetic tape 10 for each line of the television picture.

The delayed chrominance signals from the circuit 66 are supplied to a subtracting circuit 68 and also to another delay circuit 67 which is similar to the delay circuit 66. The subtracting circuit 68 functions to subtract two signals from the delayed signals from the circuit 66; one from the delay circuit 67 through the potentiometer 70; and the other from the amplifier 65 through a potentiometer 71. The potentiometers 70 and 71 function respectively to provide signals having magnitudes which are a fraction of the magnitudes of the signals introduced to the potentiometers. The attenuated signals which may be 10 decibels below the signals from the amplifier 65 and delay circuit 67 are substracted from the signal from the circuit 66. In this manner, the signals which are delayed by the transit time for reproducing one track have continuously subtracted therefrom at reduced magnitudes signals which are delayed by the transit time for reproducing two tracks and signals which are not delayed at all.

The reason for subtracting these signals is to reduce cross-talk between adjacent transverse tracks on the tape 10. Cross-talk occurs when the transducer head 11 reproduces some of the signals from adjacent tracks as well as the signals from the track it is reproducing. Some cross-talk between adjacent tracks may occur merely because of the physical contiguity of the tracks and because of the finite dimensions of the traveling wave head 11. Cross-talk may become aggravated when, due to relatively slow tape speeds, the recorded tracks are too close, or when the acoustic wave is transmitted along one edge of a transverse track or between two transverse tracks. Any lack of coordination between the passage of the acoustic waves and the transverse tracks may accentuate problems of cross-talk. Moreover, any angular variation in the position of the tape 10 relative to the transducer head 11 which is often referred to as skew, may tend to aggravate problems of cross-talk.

The cross-talk appears as noise in the reproduced signals and tends to change or distort the chrominance signals. By continuously subtracting attenuated signals derived from the preceding and following transverse tracks, most of the cross-talk and resultant color distortion is eliminated. The potentiometers 70 and 71 are set to provide signal magnitudes approximating the average magnitude of the cross-talk from the adjacent tracks.

The resulting signals from the subtracting circuit 68 with the cross-talk appreciably reduced are supplied to a limiter 74 which removes any amplitude modulation of the frequency modulated signals. From the limiter 74, the frequency modulated signals are supplied to a demodulator 75 which separates the video chrominance signals from the 10 megacycle carrier. The demodulated chrominance signals are supplied from the demodulator 75 through a low pass filter 76 which attenuates frequencies over four megacycles.

The chrominance or output signals are supplied to a gate 79 which is periodically enabled by pulses from a pulse source 80. The source 80 has a repetition rate of 15,750 pulses per second which as indicated above, is the television line frequency. The enabling pulses from the source 80 are delayed by a delay circuit 81 for an interval equal to the transit time for reproducing the information of one transverse track of the tape. In this way, the pulses from the source 80 are delayed by an interval equal to the delay interval produced on the video chrominance signals by the delay circuit 66.

The chrominance signals include a color burst frequency or signal of approximately 3.58 megacycles followed by information signals, with the information being indicated by the instantaneous phase displacement between the information signals and the bursts of reference frequency. The color burst frequency occurs once at the beginning of each horizontal scanning line or at a frequency of 15,750 cycles per second. The enabling pulses from the delay circuit 81 to the gate 79 are timed to coincide with the bursts of reference frequency. The gate 79 remains enabled for the duration of the bursts of reference frequency but becomes disabled at the termination of the enabling pulse and before the information signals following the bursts of reference frequency are received at the gate 79.

The phase of the burst of reference frequency is compared in the phase detector 85 with the phase of a signal from the source 86. The signal from the source 86 is a 3.58 megacycle signal which is the nominal frequency of the burst of reference frequency. The phase detector or comparator 85 provides a varying direct-current error signal having a magnitude and polarity related to the magnitude and direction of the phase deviation between the bursts of reference frequency and signal from the source 86.

The error signal from the detector 85 is supplied to a variable delay circuit 88 which is included in a control path from the pulse source 80 to the transducer head 11. The pulse source 80 supplies horizontal drive pulses at a frequency of 15,750 cycles to a multiplier circuit 89 which multiplies the repetition rate of the pulses from a source 80 by a factor of 6 so that pulses at a frequency of 94.5 kilocycles are supplied to the variable delay circuit 88. The pulses from the source 80 are multiplied by a factor of six because, as described above, six transverse tracks on the tape 10 are utilized to record one horizontal line of the television picture. The pulses from the delay circuit 88 at a frequency of 94.5 kilocycles are supplied to the pulse amplifier 45 which, as described above, successively excites the piezoelectric crystal 42 of the transducer head 11.

If the movement of the tape 10 adjacent the transducer head 11 causes the phase deviation to be leading, the error signal from the detector 85 causes the circuit 88 to increase the delay of the pulses to the amplifier 45. Conversely, a lagging deviation provides for a reduced time day.

In this manner, the pulse repetition rate for exciting acoustic waves is adjusted for the five elastic waves corresponding to the five information transverse tracks which follow the track in which the burst of reference frequency is recorded. The phase of the next burst of reference frequency is also adjusted but this does not change the color information because its phase deviation is thereafter compensated. In other words, the initiation of the five acoustic waves following the first acoustic wave for reproducing a horizontal line of a television picture are delayed when the error signal indicates a leading phase deviation.

The instantaneous phase displacement between the information portion of the chrominance signal and the burst of reference frequency is, therefore, adjusted in accordance with the phase deviation of the burst of reference frequency. As indicated above, the phase deviations in the bursts of reference frequency relate to the variations in longitudinal speed of the tape and in the transverse disposition of the magnetic tape 10 relative to the transducer head 11. The chrominance signals at the output of the low-pass filter are, in this manner, stabilized. The phase of each burst of reference frequency is adjusted by its preceding burst, color distortion is removed in the subtracting circuit 68 and the color hues are compensated for phase displacements during recording and reproduction.

Although this application has been disclosed and illustrated with reference to particular applications, the principles involved are susceptible of numerous other applications which will be apparent to persons skilled in the art. For example, the various mentioned frequencies and repetition rates are merely illustrative. The invention is, therefore, to be limited only as indicated by the scope of the appended claims.

I claim:

1. In a system for reproducing information recorded as successive tracks on a recording medium, means coupled to the recording medium for successively providing signals, each representing the information recorded as one of the successive tracks on the recording medium, said providing means having a particular constant instantaneous reproducing speed, a source of reference signals, means coupled to said providing means and to said source for comparing the phase of one of the signals from said providing means with the phase of the reference signals from said source and for providing an error signal in accordance therewith, and means coupled to said comparing means and to said pulse providing means for adjusting the repetition rate of said providing means in accordance with the error signal from said comparing means with the instantaneous reproducing speed remaining the same.

2. In a reproducing system in which successive transverse tracks arranged in groups on a recording medium are progressed adjacent a sensing member extending transversely across the recording medium, means coupled to the sensing member for recognizing variations in phase of signals reproduced by the sensing member from the first transverse track in each group of tracks on the recording means, and means coupled to said recognizing means and to the sensing member for advancing or delaying reproducing signals recorded on a number of the successive tracks following said first transverse track in each group in accordance with the recognized variations in phase by said recognizing means.

3. In a reproducing system wherein successive transverse tracks on a recording medium are progressed adjacent a sensing member extending transversely across the recording medium, means coupled to the sensing member for delaying signals reproduced from the recording medium by the sensing member, for an interval which is in integral multiple of the time for reproducing a transverse track means coupled to said delaying means for recognizing variations in phase of the delayed signals from said delyaing means, and means coupled to said recognizing means and to the sensing member for advancing or delaying reproducing signals recorded in a number of successive transverse tracks on the recording means in accordance with the recognized variations in phase by said recognizing means.

4. In a system for reproducing information recorded as successive tracks on a movable recording medium, a traveling wave transducing member in which the waves travel at a fixed speed, said member including means for initiating the traveling waves, means coupled to the transducing member for receiving signals representing reproduced information recorded as one of the successive tracks on the recording medium, means coupled to said receiving means for recognizing variations in phase of the signals representing the recorded information, means coupled to said recognizing means for providing an error signal in accordance with the recognized phase variations, and means coupled to said providing means and to the initiating means of the transducing member for adjusting the timing of the waves in the transducing member whereby the coordination between the waves in the transducing member and the movement of the recording medium is adjusted.

5. In a transverse reproducing system in which successive transverse tracks on a magnetic tape are progressed adjacent transducer means extending transversely across the tape, transducer means having a constant reproducing speed and variable repetition rate for reproducing successive tracks, means coupled to the transducer means for delaying the reproduced signals from the transducer means by an interval equal to the time for reproducing the signals recorded in one transverse track of the tape, a reference source of signals, means coupled to said delaying means and to said source for determining the deviation in phase of said delayed signals from the phase of said reference signals, and means coupled to said determining means and to the transducer means for adjusting the repetition rate of the transducer means for reproducing signals recorded in successive transducer tracks on the magnetic tape.

6. In a reproducing system in whch information in the form of the instantaneous phase displacement between information signals and reference signals is recorded on successive transverse tracks on a recording medium progressed adjacent a sensing member, means coupled to the sensing member for delaying reproduced signals from the sensing member by time intervals equal to the time for reproducing the signals recorded in one transverse track of the recording medium, a reference source of oscillations, means coupled to said delaying means and to said source for determining the deviation in phase of the delayed reference signals from said delaying means and the oscillations from said source, and means coupled to said determining means and to the sensing member for advancing or delaying the reproduction of the information signals recorded on successive transverse tracks following the transverse track on which the reference signals are recorded in accordance with the determined deviation in phase whereby the phase displacement between the information and reference signals is adjusted.

7. In a transverse recording and reproducing system for color television, apparatus for stabilizing reproduced chrominance signals in which the color information is determined by the instantaneous phase displacement between color signals and reference signals, including, reproducing means, means coupled to the reproducing means for delaying the reproduced chrominance signals by a particular time interval equal to an integer multiple of the duration for reproducing one transverse track of the signals by the reproducing means; a source of signals of constant frequency; means coupled to said delaying means and to said source for producing an error signal related to the variation in phase of the chrominance reference signals from said delaying means with respect to the phase of the signals from said source; means coupled to the reproducing means for generating a series of control pulses for initiating the reproduction of the transversely recorded chrominance signals including variable delay means coupled to the reproducing means for varying the duty cycle of the control pulses; and means coupled to said reproducing means and to the variable delay means of said generating means and responsive to the error signal for introducing the error signal to said variable delay means to control the delay provided thereby in accordance with said error signal.

8. Apparatus for compensating the phase distortion introduced in a transverse recording and reproducing system wherein information on successive transverse tracks of a recording medium is conveyed by the phase relationship between bursts of reference oscillations and the instantaneous phase of information signals following the bursts of reference oscillations, adjustable means for successively initiating the reproduction of the reference oscillations and information signals on the successive transverse tracks of the recording medium, said adjustable means including a pulse generator for successively initiating the reproducing of the transverse tracks, means for successively operating said generator and the operation of varying means for advancing or delaying the said operating means, gating means coupled to said adjustable means for separating reproduced signals representing bursts of reference oscillations from reproduced signals representing information signals, a source of reference signals, means coupled to said gating means and to said source for generating an error signal related to the variation in phase of the bursts of reference oscillations with respect to the phase of the reference signals from said source, and means coupled to said generating means and to said varying means for controlling said varying means to advance or delay the successively initiated reproductions of information signals in accordance with the error signal from said generating means.

9. In a reproducing system wherein information recorded on a medium is conveyed by the phase relationship between reference oscillations and information signals following the reference oscillations, means coupled to the medium for sequentially reproducing the reference oscillations and the information signals including variable delay means for varying the phase of reproduced information signals with respect to the phase of reproduced reference oscillations, means coupled to said reproducing means for continuously delaying the reference oscillations and the information signals for an interval substantially equal to the time for reproducing the reference oscillations by said reproducing means, means coupled to said delaying means for separating the delayed reference oscillations from the delayed information signals, a source of reference signals, means coupled to said source and to said separating means for generating an error signal having a magnitude and polarity determined by the magnitude and direction of the phase deviation between the separated reference oscillations and the reference signals from said source, and means coupled to said generating means and to said variable delay means for introducing the generated error signal to said variable delay means for compensating any phase distortion due to recording and reproducing the reference oscillations and the information signals.

10. Apparatus for compensating the phase distortion introduced in a transverse recording and reproducing system wherein information of successive transverse tracks of a recording medium is conveyed by the phase relationship between bursts of reference oscillations and the instantaneous phase of information signals following the bursts of reference oscillations, adjustable means for successively initiating the reproduction of the reference oscillations and information signals on the successive tracks of the recording medium, said adjustable means including a pulse source having a repetition rate equal to the normal repetition rate for successively reproducing transverse tracks on the recording medium, an adjustable delay circuit coupled to said pulse source for delaying the pulses provided from said pulse source, and a transverse reproducing head coupled to said delay circuit and responsive to the delayed successive pulses from said delay circuit for reproducing the signals recorded on the successive tracks with the signals on each of the successive tracks being reproduced responsive to a different one of the delayed successive pulses; gating means coupled to said pulse source and responsive to the successive pulses from said pulse source and coupled to said reproducing head for separating reproduced signals representing bursts of reference oscillations from reproduced signals representing information signals; a source of reference signals; means coupled to said gating means and to said source for generating an error signal related to the variation in phase of the bursts of reference oscillations with respect to the phase of the reference signals from said source; and means coupled to said generating means and to said adjustable delay circuit for controlling said adjustable delay circuit to advance or delay the successively initiated reproductions of information signals in accordance with the error signal from said generating means.

11. Apparatus for reproducing information recorded in successive tracks of a recording medium, a reproducing head positioned relative to the recording medium for successively generating signals which correspond to information recorded on the successive tracks and including means for initiating the reproduction of said signals; a source of reference signals; a comparing circuit coupled to said head and to said source for comparing the phase of the signals reproduced from the first track of each of a number of groups of successive tracks with the phase of the reference signals and for generating an error signal in accordance therewith; and control means coupled to said comparing circuit and to said initiating means of said head and responsive to the error signal for advancing or delaying the initiation of the signals reproduced from the remaining tracks of the group.

12. In a system for reproducing information recorded as successive transverse tracks on a moving medium stationary means disposed transversely relative to the medium for reproducing the information at successive positions along each transverse track on the medium upon each activation of the reproducing means, means operatively coupled to the reproducing means for activating the reproducing means, and means responsive to the information reproduced from each transverse track on the medium and operatively coupled to the activating means for controlling the time for activating the reproducing means in accordance with the reproduced information to compensate for variations in the positioning of the medium relative to the reproducing means in the transverse direction.

13. In a system for reproducing color information recorded as successive transverse tracks on a moving medium where the color information includes bursts of signals at a particular frequency, means disposed transversely relative to the medium for reproducing the information at successive positions along each transverse track on the medium only upon each activation of the reproducing means, means operatively coupled to the reproducing means for activating the reproducing means, means for providing reference signals at the particular frequency, means responsive to the reference signals and to the reproduced bursts of signals at the particular frequency for comparing the phases of the reference signals and the reproduced signals to produce control signals in accordance with the results of such comparison, and means responsive to the control signals and operatively coupled to the activating means for controlling the times of activating the activating means to compensate for variations in the positioning of the medium relative to the reproducing means in the transverse direction.

14. In a system for reproducing information recorded as successive transverse tracks on a moving medium, means disposed in the transverse direction relative to the medium for sequentially reproducing the information at successive positions along each transverse track on the medium upon each introduction of a pulse to the medium to activate the medium at successive positions along the reproducing means, means operatively coupled to the reproducing means for introducing activating pulses to the reproducing means for a passage of the pulses through the medium to activate successive positions on the medium in the transverse direction, means for providing reference signals, means responsive to the reference signals and to the reproduced information for comparing the relative phases of the reference signals and the reproduced information to produce control signals in accordance with such information wherein the control signals represent variations in the positioning of the moving medium relative to the reproducing means in the transverse direction, and means responsive to the control signals and operatively coupled to the pulse means for controlling the times for the introduction of the activating pulses to the reproducing means to compensate for the variations in the positioning of the moving medium relative to the reproducing means in the transverse direction.

15. The system set forth in claim 14 in which the reproducing means is stationary and extends in the transverse direction across the moving medium.

16. In a system for reproducing color information recorded as successive transverse tracks on a moving medium where the color information includes bursts of signals at a particular frequency, means disposed in the transverse direction relative to the medium for sequentially reproducing the information at successive positions along each transverse track on the medium upon each introduction of a pulse to the medium to activate the medium at successive positions along the reproducing means, means operatively coupled to the reproducing means for introducing activating pulses to the reproducing means for a passage of the pulses through the medium to activate successive positions on the medium in the transverse direction, means for providing reference signals at the particular frequency, means responsive to the reference signals and to the reproduced bursts of signals at the particular frequency for comparing the phases of such signals to produce control signals in accordance with such comparison, and means responsive to the control signals and operatively coupled to the pulse means for controlling the times for the production of the activating pulses to compensate for any variations in the position of the moving medium relative to the reproducing means in the transverse direction.

17. The system set forth in claim 16, including, gating means operatively coupled to the pulse means and the phase-comparing means for opening the gating means to pass only the reproduced bursts of signals to the phase-comparing means for comparison with the reference signals.

18. The system set forth in claim 13, including, means responsive to the information from the reproducing means for operating upon such signals to minimize cross-talk.

19. The system set forth in claim 14, including, first delay means responsive to the information from the reproducing means for delaying the information for a period of time corresponding to the scan of one transverse track on the moving medium, second delay means responsive to the delayed information from the first delay means for delaying the information for an additional period of time corresponding to the scan of one transverse track on the moving medium, and means responsive to the signals from the reproducing means and from the first and second delay means for combining the signals in a particular relationship to reproduce the signals with a minimizing of cross-talk between adjacent transverse tracks.

20. The system set forth in claim 17, including, first control means responsive to the signals from the reproducing means for passing a first particular portion of such signals, first delay means responsive to the information from the reproducing means for delaying the information for a period of time corresponding to the scan of one transverse track on the moving medium, second delay means responsive to the delayed information from the first delay means for delaying the information for an additional period of time corresponding to the scan of one transverse track on the moving medium, second control means responsive to the signals from the second delay means for passing a second particular portion of such signals, and means responsive to the signals from the first delay means and from the first and second control means for combining such signals in a particular arithmetic relationship to minimize cross-talk, and means responsive to the signals from the last-mentioned combining means for introducing such signals to the gating means for the passage only of the reproduced bursts of signals through the gating means.

References Cited in the file of this patent

UNITED STATES PATENTS

| | | |
|---|---|---|
| 2,683,856 | Korner | July 13, 1954 |
| 2,762,861 | Somers | Sept. 11, 1956 |
| 2,780,774 | Epstein | Feb. 5, 1957 |
| 2,828,478 | Johnson | Mar. 25, 1958 |
| 2,866,012 | Ginsburg et al. | Dec. 23, 1958 |
| 2,876,295 | Irby | Mar. 3, 1959 |
| 2,900,444 | Camras | Aug. 18, 1959 |
| 2,921,989 | Serell | Jan. 19, 1960 |